Patented Aug. 23, 1932

1,873,934

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

VULCANIZATION ACCELERATOR

No Drawing. Application filed September 5, 1930, Serial No. 480,018, and in Germany November 8, 1927.

The present invention relates to a process of vulcanizing rubber compounds and consists in effecting the vulcanization in the presence of an accelerator of the probable formula

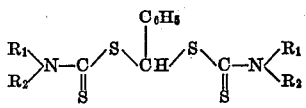

wherein $R_1$ means the cyclohexyl group or a homologue thereof and $R_2$ stands for a hydrocarbon radical, which may be linked up with $R_1$ to form a ring configuration. The invention, furthermore, relates to the vulcanized rubber compounds obtainable by the process above identified.

In accordance with the invention a compound of the above formula is incorporated, for example, by rolling or kneading within the rubber compounds to be vulcanized together with or apart from the other ingredients usually employed in vulcanization processes, such as sulfur, selenium, aromatic nitro compounds+metal oxides or other vulcanizing agents, fillers, plasticizing agents, pigments etc. Vulcanization of the mixtures thus produced is performed by heating with or without the application of superatmospheric pressure, advantageously to temperatures between about 100–150° C.

It may be mentioned that the term "rubber compound is intended to include natural rubber varieties and artificial rubber like masses obtainable by polymerizing a rubber forming hydrocarbon, such as butadiene- (1.3) or a homologue or analogue thereof alone or in admixture with one another or in admixture with other suitable compounds which are capable of being polymerized, such as styrol, vinylnaphthalenes etc. Obviously, instead of a single one of our vulcanization accelerators, mixtures of two or more of the same may be applied and, if desired, accelerators of any other type may be used simultaneously.

This application is a continuation in part of our copending application Serial No. 240,331, filed December 15, 1927.

The following examples will illustrate the invention without limiting it thereto, the parts being by weight.

Example 1

100 parts of smoked sheets
5 parts of zinc oxide
3.5 parts of sulfur
0.5 part of stearic acid and
0.5 part of the compound of the probable formula:

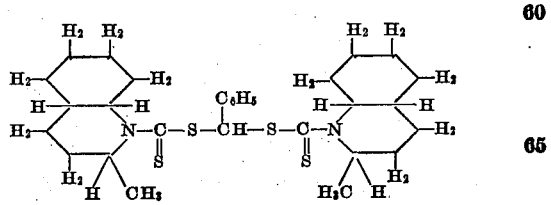

are mixed by rolling or kneading and the mixture is vulcanized at a steam pressure of 2.5 atmospheres (about 130° C.) for 20 minutes. The vulcanizate thus obtainable shows a tensile strength of 211 kg/sqcm. at a stretch of 820%.

The accelerator employed in this example may be obtained in the following manner:

306 parts of dekahydroquinaldine are dissolved in 500 parts of alcohol and to this solution 76 parts of carbonbisulfide are caused to run in while cooling with ice water. 80 parts of benzalchloride are added and the reaction mixture is boiled for several hours under a reflux condenser. A water-benzene mixture is then added and, after thoroughly shaking, the benzene layer is drawn off, dried with calcium chloride and distilled in vacuo. There remains the benzal-bis-dithiourethane of dekahydroquinaldine of the formula given above, which is difficultly soluble in alcohol or benzine, easily soluble in benzene and ether.

Example 2

100 parts of smoked sheets
5 parts of zinc oxide
3.5 parts of sulfur
1 part of stearic acid and
1 part of the accelerator of the formula:

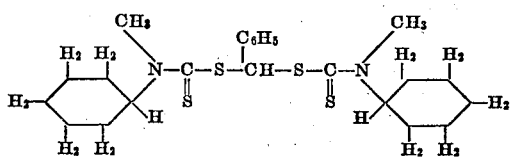

are mixed by rolling or kneading and the mixture is vulcanized at a steam pressure of about 3 atmospheres (about 140° C.) for 10 minutes. The vulcanizate thus obtainable shows a tensile strength of 219 kg/sqcm. at a stretch of 739%.

The accelerator used in this example, benzal-bis-(methylcyclohexyl-dithiourethane), can be prepared in an analogous manner as described in example 1, by replacing the 306 parts of dekahydroquinaldine with 226 parts of hexahydromethylaniline.

Example 3

100 parts of smoked sheets
5 parts of zinc oxide
3.5 parts of sulfur
0.5 part of stearic acid
0.5 part of an accelerator of the formula:

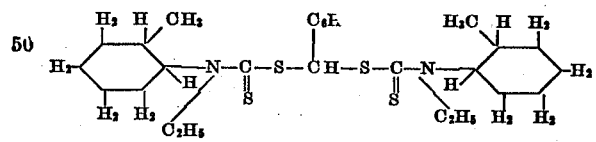

are mixed by rolling or kneading and the mixture is vulcanized at a steam pressure of 2.5 atmospheres (about 130° C.) for 20 minutes. The vulcanizate thus obtainable shows a tensile strength of 202 kg/sqcm. at a stretch of 739%.

The accelerator used in this example, benzal-bis-(ethylhexahydrotolyl-dithiourethane), can be prepared as described in example 1 by replacing the 306 parts of dekahydroquinaldine by 280 parts of hexahydroethyl-ortho-toluidine.

Example 4

100 parts of a rubber like mass obtained by polymerizing butadiene-(1.3) in the presence of sodium metal
60 parts of lamp black
15 parts of zinc white
4 parts of a mixture of equal parts of colophony and pine tar
2 parts of stearic acid
1 part of sulfur and
0.6 part of the accelerator used in Example 2
are mixed by rolling or kneading and the mixture is vulcanized at a steam pressure of 4 atmospheres (about 150° C.) for 40 minutes. The vulcanizate thus obtainable shows a tensile strength of 150 kg/sqcm. at a stretch of 575%.

Similar results are obtainable by replacing the accelerators mentioned in the examples, for example, with the compounds of the formulae:

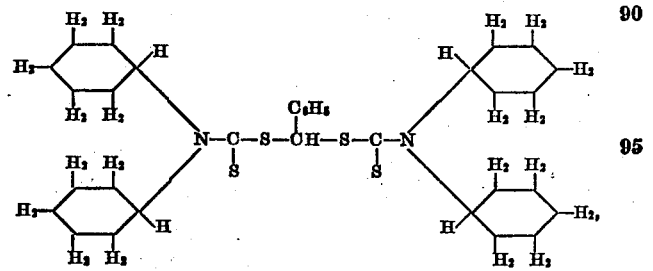

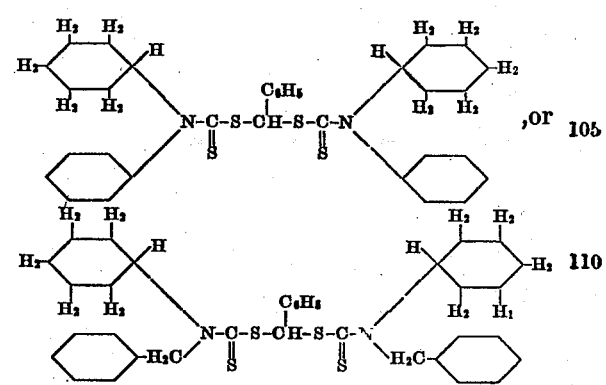

obtainable as described in Example 1 by replacing the dekahydroquinaldine with di-(cyclohexyl)-amine or cyclohexylaniline or cyclohexylbenzylamine.

We claim:—

1. Process for the manufacture of vulcanized rubber compounds which consists in effecting the vulcanization in the presence of a compound of the probable formula:

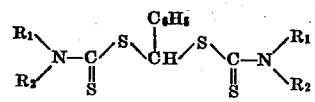

wherein $R_1$ means the cyclohexyl group or a homologue thereof and $R_2$ stands for a hydrocarbon radical, which may be linked up with R1 to form a ring configuration.

2. Process for the manufacture of vulcanized rubber compounds which consists in effecting the vulcanization in the presence of a compound of the probable formula:

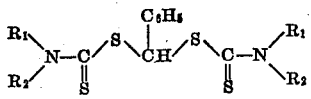

wherein $R_1$ means the cyclohexyl group or a homologue thereof and $R_2$ stands for an alkyl group, which may be linked up with $R_1$ to form a ring configuration.

3. Process for the manufacture of vulcanized rubber compounds which consists in effecting the vulcanization in the presence of a compound of the probable formula:

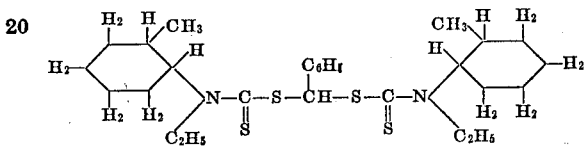

4. Process for the manufacture of vulcanized rubber compounds which consists in effecting the vulcanization in the presence of a compound of the probable formula:

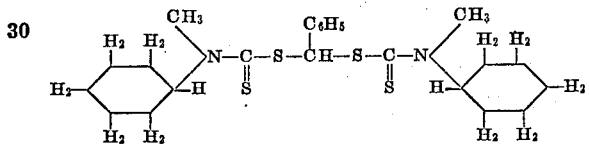

5. Process for the manufacture of vulcanized rubber compounds which consists in effecting the vulcanization in the presence of a compound of the probable formula:

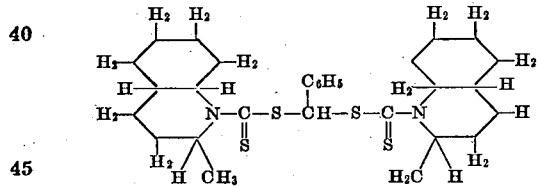

6. As new products of manufacture, vulcanized rubber compounds obtainable according to claim 1.

7. As new products of manufacture, vulcanized rubber compounds obtainable according to claim 2.

8. As new products of manufacture, vulcanized rubber compounds obtainable according to claim 3.

9. As new products of manufacture, vulcanized rubber compounds obtainable according to claim 4.

10. As new products of manufacture, vulcanized rubber compounds obtainable according to claim 5.

In testimony whereof, we affix our signatures.

WILHELM LOMMEL.
THEODOR GOOST.
HERMANN FRIEDRICH.

Certificate of Correction

Patent No. 1,873,934. August 23, 1932.

WILHELM LOMMEL ET AL.

It is hereby certified that error appears in the printed specification of the above-numbered patent requiring correction as follows: Page 2, between lines 108 to 112, strike out the upper right-hand nucleus of the formula and insert instead—

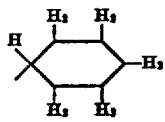

page 3, between lines 39 to 45, claim 6, strike out the right-hand portion of the formula and insert instead—

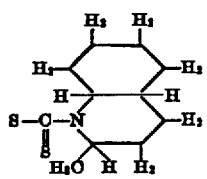

and that the said Letters Patent should be read with these corrections therein that the same may conform to the record of the case in the Patent Office.

Signed and sealed this 14th day of February, A. D. 1933.

[SEAL.]

M. J. MOORE,
*Acting Commissioner of Patents.*